United States Patent Office 2,945,052
Patented July 12, 1960

2,945,052
PREPARATION OF DIALKENYL PHENYL PHOSPHONATES

Charles H. Alexander, Bethany, Conn., assignor to United States Rubber Company, New York, N.Y., a corporation of New Jersey No Drawing. Filed Mar. 10, 1955, Ser. No. 493,539

3 Claims. (Cl. 260—461)

This invention relates to a new and improved process for the synthesis of dialkenyl phenyl phosphonates.

According to the present invention, a compound such as diallyl phenyl phosphonate is prepared by the temperature-controlled reaction of allyl alcohol and phenyl phosphorus oxydichloride, using a molar ratio of the reactants varying from 2.2:1 to 6:1, preferably 3:1, in an inert solvent such as benzene, toluene, methylene dichloride, ligroin, dioxane, ether, etc., using a concentrated aqueous solution of an alkali hydroxide as the hydrogen chloride acceptor. The amount of the inert solvent is not critical; varying amounts are usable.

The reaction is illustrated by the equation

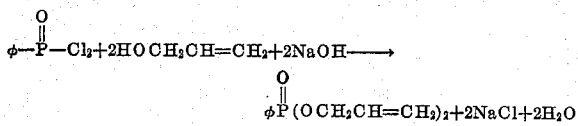

$\phi$ represents the phenyl nucleus.

In place of allyl alcohol, other 2-alkenols, such as methallyl alcohol, may be used. Exemplary of the alkali hydroxides are sodium hydroxide and potassium hydroxide.

In the absence of a base to remove the hydrogen chloride, the ester formed would be decomposed into acid monoesters and allylic chlorides.

Operating temperatures may range from 0° C. to 30° C., although best results are provided with the use of an optimum temperature range of from about 10° C. to about 20° C.

Removal of the hydrogen chloride has, in the past, been accomplished by the use of a tertiary organic amine base. However, such a procedure is quite expensive and any commercial adaption requires the tedious recovery, purification and reuse of the organic base. Such a procedure using the organic base such as pyridine is described in U.S. Patent No. 2,425,765, dated August 19, 1947, to Arthur D. F. Toy.

By my invention, I eliminate the need of expensive tertiary organic bases, and substitute, preferably, the relatively cheap concentrated aqueous NaOH. My procedure provides a commercially feasible method of preparing in high yields substantially pure dialkenyl phenyl phosphonate and also eliminates the necessity for a high vacuum distillation.

The following examples illustrate the invention; parts are by weight.

Example 1

Phenyl phosphorus oxydichloride (98 g.) was charged into a three-neck round-bottom flask fitted with a stirrer, thermometer, drying tube and a dropping funnel. Dry toluene (200 g.) was added to the dichloride and the solution was cooled to 0° C. Allyl alcohol (87 g.) was cooled to 0° C. and added to the above solution. There was a slight exotherm (the temperature rose to 5° C.). The reaction mixture was stirred with external cooling (ice-salt water bath) until the temperature fell to 0° C. A concentrated solution of sodium hydroxide in $H_2O$ (1:1) was added to the reaction mixture at such a rate that the reaction temperature did not exceed 10° C. The addition time was about 1.5 hours; the reaction mixture was stirred 1 hour further at 0–10° C. The NaCl was filtered out, the water layer separated and the solution dried over anhydrous $Na_2SO_4$. The drying agent was filtered out and washed with 50 ml. dry toluene which was added to the main body of solution. The solution was then topped of toluene and excess allyl alcohol at 40–50° C. as the pressure was gradually reduced to 3–5 mm. The product was topped by heating at 50° C. and 3–5 mm. for at least 0.5 hour.

A crude yield of 89.1% was obtained. The product was a clear straw colored liquid having a refractive index of 1.5220 at 25° C.

Example 2

Phenyl phosphorus oxydichloride (98 g.) was charged into a three-neck round-bottom flask fitted with a stirrer, thermometer, and a dropping funnel. Dry benzene (200 ml.) was added and the solution cooled to 10° C. Allyl alcohol (87 g.) was cooled to 10° C. and added to the above solution with cooling (water-ice bath). A concentrated solution of sodium hydroxide (42 g. in 42 g. $H_2O$) was added to the reaction mixture at such a rate that the reaction temperature did not exceed 20° C. The addition time was 1.05 hours and the reaction mixture was stirred 0.5 hour further at 10–20° C. The sodium chloride was filtered out, the water layer separated and the solution was dried over anhydrous sodium sulfate. The drying agent was filtered out and the solution topped of benzene and excess allyl alcohol at reduced pressure (100 mm.–5 mm.) and 50° C. Tertiary butyl catechol (50 p.p.m.) was added as a stabilizer.

A crude yield of 106.8 g. (89.8% of theory) of a light colored liquid ($n\ d/25$ 1.5249) was obtained.

Example 3

Phenyl phosphorus oxydichloride (98 g.) was charged into a three-neck one-liter flask fitted with a glass stirrer, dropping funnel, thermometer and a drying tube. Methylene dichloride (200 ml.) was added and the solution was cooled to 10° C. Allyl alcohol (87 g.) was cooled to 10° C. and added to the above solution with cooling (ice-water bath). A concentrated solution of sodium hydroxide (42 g. in 42 g. $H_2O$) was added dropwise at such a rate that the temperature did not exceed 20° C. The addition time was 0.85 hour and the reaction mixture was stirred 0.5 hour further at 10–25° C. It was then filtered, separated from the water layer and dried over anhydrous sodium sulfate. The drying agent was filtered out and washed with 50 ml. methylene dichloride. The methylene dichloride was distilled out at atmospheric pressure and the product was then topped of any remaining solvent and excess allyl alcohol at reduced pressure (50–10 mm.) and 50° C. There was 107 g. product (90% of theory) with a refractive index of 1.5299.

Example 4

Phenyl phosphorus oxydichloride (98 g.) was charged into a one-liter three-neck round-bottom flask, fitted with a stirrer, thermometer, Y-tube, drying-tube and a dropping funnel. Dry toluene (200 ml.) was added to the dichloride and the solution was cooled to —8° C. Methallyl alcohol (108.0 g. anhydrous) was cooled to —8° C. and added to the solution of the dichloride; there was a slight exotherm, and the temperature rose to 0° C. A concentrated solution of sodium hydroxide in water (1:1) (85.4 g.) was added to the reaction mixture at such a rate that the temperature did not exceed +5° C. The addition time was 1.0 hour. The reaction mixture was stirred 15 minutes at 0° C. and then slowly warmed to 20° C. The sodium chloride was filtered out, the water separated and the solution dried over anhydrous sodium sulfate. The sodium sulfate was filtered out and washed with 50 ml. dry toluene. The solution was then topped of toluene and excess methallyl alcohol by heating at 50–60° C. and 100 to 5 mm. pressure. Tertiary butyl catechol (50 p.p.m.) was added as stabilizer.

The product was a clear liquid. The yield was 100 g., 75% of theoretical.

The concentrated aqueous solution of alkali metal hydroxide may contain from 40 to 70 percent by weight of the hydroxide. A 1:1 ratio concentration indicates about 50 percent by weight concentration of the hydroxide, that is, about 100 parts of the hydroxide being dissolved in 100 parts of water.

Having thus described my invention, what I claim and desire to protect by Letters Patent is:

1. In a method of preparing dialkenyl phenyl phosphonates from an alkenol and phenyl phosphorus oxydichloride in the presence of an inert solvent medium, the improvement which consists in reacting the alkenol with the said oxydichloride in the inert solvent medium in the presence of a concentrated aqueous solution of alkali metal hydroxide, at a temperature not in excess of about 30° C.

2. A process as set forth in claim 1 in which the alkenol is allyl alcohol.

3. A process as set forth in claim 1 in which the alkenol is methallyl alcohol.

References Cited in the file of this patent

UNITED STATES PATENTS

| | | |
|---|---|---|
| 2,365,466 | Armstrong | Dec. 19, 1944 |
| 2,425,765 | Toy | Aug. 19, 1947 |
| 2,503,390 | Jelinck | Apr. 11, 1950 |
| 2,557,805 | Upson | June 19, 1951 |

OTHER REFERENCES

Karrer: Organic Chemistry, Elsevier Publishing Co., Inc. (New York, N.Y.) (1950), page 522.